US009415824B2

(12) United States Patent
Maier

(10) Patent No.: US 9,415,824 B2
(45) Date of Patent: Aug. 16, 2016

(54) DEVICE FOR GUIDING A SADDLE POLE

(76) Inventor: Marzell Wilhelm Maier, Isny/Sommersbach (DE)

( * ) Notice: Subject to any disclaimer, the term of this patent is extended or adjusted under 35 U.S.C. 154(b) by 195 days.

(21) Appl. No.: 13/820,244

(22) PCT Filed: Aug. 27, 2011

(86) PCT No.: PCT/EP2011/004312

§ 371 (c)(1),
(2), (4) Date: Apr. 9, 2013

(87) PCT Pub. No.: WO2012/028282

PCT Pub. Date: Mar. 8, 2012

(65) Prior Publication Data

US 2013/0209160 A1 Aug. 15, 2013

(30) Foreign Application Priority Data

Sep. 3, 2010 (DE) ........................ 10 2010 044 356

(51) Int. Cl.
*B62K 19/36* (2006.01)
*B62J 1/08* (2006.01)

(52) U.S. Cl.
CPC . *B62K 19/36* (2013.01); *B62J 1/08* (2013.01); *B62J 2001/085* (2013.01); *Y10T 403/1624* (2015.01); *Y10T 403/32467* (2015.01); *Y10T 403/32516* (2015.01)

(58) Field of Classification Search
CPC ..... B62K 19/36; B62J 1/08; Y10T 403/7022; Y10T 403/7054; Y10T 403/7061; Y10T 403/32475; Y10T 403/32483
USPC ............ 403/13, 14, 357, 369, 372, 202, 203, 403/225, 226
See application file for complete search history.

(56) References Cited

U.S. PATENT DOCUMENTS

| | | | | |
|---|---|---|---|---|
| 792,733 | A * | 6/1905 | Schoenherr | 403/369 |
| 3,722,929 | A * | 3/1973 | Gilman | 403/359.6 |
| 3,852,850 | A * | 12/1974 | Filhaber | 24/136 R |
| 4,033,438 | A * | 7/1977 | Wiltsey | 192/84.9 |
| 4,097,756 | A * | 6/1978 | Gee | 310/155 |
| 4,182,508 | A | 1/1980 | Kallai et al. | |

(Continued)

FOREIGN PATENT DOCUMENTS

| | | |
|---|---|---|
| DE | 42 37 864 | 5/1994 |
| DE | 94 05 449 | 9/1994 |

(Continued)

OTHER PUBLICATIONS

International Search Report of PCT/EP2011/004203, Oct. 31, 2011.

(Continued)

*Primary Examiner* — Jonathan Masinick
(74) *Attorney, Agent, or Firm* — Smartpat PLC

(57) ABSTRACT

At least one slide block is installed on the saddle pole for optimal guiding, as far as possible free of play, of a saddle pole in a cladding tube, at the lower end of the saddle pole. The slide block(s) engage in a groove-shaped recess in the cladding tube, said groove-shaped recess of the cladding tube having at least one length, which corresponds to the requested adjustment stroke of the saddle pole. At least one contact surface of the saddle pole, on which a planar slide block is installed, is planar and the side of the planar slide block, which is installed on the saddle pole with the planar contact surface, also has a planar surface.

17 Claims, 6 Drawing Sheets

(56) References Cited

U.S. PATENT DOCUMENTS

| | | | | |
|---|---|---|---|---|
| 4,311,224 | A * | 1/1982 | Kato et al. | 192/56.5 |
| 4,772,069 | A | 9/1988 | Szymski | |
| 4,792,713 | A * | 12/1988 | Bush | 310/216.123 |
| 5,645,366 | A * | 7/1997 | Ishibashi et al. | 403/359.5 |
| 5,713,555 | A * | 2/1998 | Zurfluh et al. | 248/599 |
| 5,881,988 | A | 3/1999 | Liu | |
| 6,354,557 | B1 * | 3/2002 | Walsh | 248/600 |
| 6,769,830 | B1 * | 8/2004 | Nygren | 403/322.1 |
| 6,824,471 | B2 * | 11/2004 | Kamenov | 464/182 |
| 7,083,180 | B2 * | 8/2006 | Turner | 280/287 |
| 7,422,224 | B2 * | 9/2008 | Sicz et al. | 280/274 |
| 8,317,261 | B2 * | 11/2012 | Walsh | 297/215.13 |
| 2001/0016146 | A1 * | 8/2001 | Blanchard | 403/357 |
| 2006/0066074 | A1 | 3/2006 | Turner | |
| 2006/0175792 | A1 | 8/2006 | Sicz et al. | |
| 2008/0199254 | A1 * | 8/2008 | Baker et al. | 403/372 |

FOREIGN PATENT DOCUMENTS

| | | |
|---|---|---|
| DE | 198 55 161 | 2/2000 |
| DE | 20 2007 014 515 | 1/2008 |
| DE | 20 2008 015 968 | 4/2010 |
| DE | 10 2010 044 356 | 3/2012 |
| EP | 0 148 979 | 7/1985 |
| FR | 2 758 305 | 7/1998 |
| WO | 2007/117884 | 10/2007 |

OTHER PUBLICATIONS

International Search Report of PCT/EP2011/004312, Oct. 11, 2011.

* cited by examiner

DEVICE FOR GUIDING A SADDLE POLE

CROSS REFERENCE TO RELATED APPLICATIONS

This application is the National Stage of PCT/EP2011/004312 filed on Aug. 27, 2011, which claims priority under 35 U.S.C. §119 of German Application No. 10 2010 044 356.5 filed on Sep. 3, 2010, the disclosure of which is incorporated by reference. The international application under PCT article 21(2) was published in English.

BACKGROUND OF THE INVENTION

1. Field of the Invention

The invention relates to a device for guiding a saddle pole in a cladding tube

2. The Prior Art

Saddle poles for fastening bicycle saddles are usually fixed in the saddle tube with a mechanical clamp. Consequently, the saddle tube is generally slit at the upper end so that the periphery of the tube is reduced by the clamping effect and thus the saddle tube bears upon the saddle pole with a positive fit. The clamp is tightened with a screw and nut connection or a quick clamping device is used, at which the clamping force is reached by changing the position of a lever. Such a "quick release lever" enables to adjust the height of the saddle and to fix it without tool. This is for example necessary if the bicycle is going to be ridden by people of different size or if the saddle should be adapted for one and the same rider using certain parameters. Such is the case for instance when riding in difficult terrain, as in particular in mountain biking with mountain bikes. Uphill, the height of the saddle must be adjusted optimally from an ergonomic viewpoint so as to achieve good power transmission. When going downhill, the rider must shift his centre of gravity backwards and downwards according to the steepness and to the difficulty and to that end he must often bring his buttocks behind the saddle. The deeper the saddle, the easier the rider can shift his centre of gravity actively and dynamically, but thereby also loses on cornering forces which he can apply with the inside of its thighs against the saddle when the latter is accordingly in a raised position. The optimal height of the saddle therefore depends on the respective riding condition.

The shortcoming of the described clamping devices lies in that the rider must dismount every time and adjust the height of the saddle. Different devices for (semi-automatic) height adjustment of a bicycle saddle are therefore already offered on the market, which the rider can adjust while riding his bike.

Since these semi-automatic saddle poles (as described for instance in document DE 10 2010 044 356.5) are not clamped any longer in their respective position as mentioned above, but rather locked via a pin or similar or for instance fixed hydraulically, they naturally have a clearance, which is necessary on the one hand so that the height of the saddle pole can be adjusted easily, which is undesirable on the other hand while riding his bike, i.e. when the saddle pole is locked, because the rider has a mechanically unstable feeling.

A height adjustable saddle pole is disclosed in the international patent application WO 2007/117884 A2, which is run in the cladding tube by means of a bushing (FIG. 2, reference sign 74). This known saddle pole also includes slide blocks or groove blocks which engage into corresponding grooves of a cladding tube. These groove blocks are used however exclusively for preventing rotation of the saddle pole, but not for guiding it in the cladding tube.

SUMMARY OF THE INVENTION

The object of the invention is hence to provide a guiding means for a saddle pole so that on the one hand the saddle pole can be adjusted easily and on the other hand is fixed free of play as far as possible under stress.

This object is met by a device for guiding a saddle pole in a cladding tube, wherein at least one slide block installed on the saddle pole, at the lower end of the saddle pole the slide block(s) engage in a groove-shaped recess in the cladding tube, the groove-shaped recesses of the cladding tube have at least one length, which corresponds to the requested adjustment stroke of the saddle pole, whereas at least one contact surface of the saddle pole, on which a planar slide block is installed, is planar, and the side of the planar slide block, which is installed on the saddle pole with the planar contact surface, also has a planar surface.

The expression "planar slide block" should be understood in the sense of this application as only the side of the slide block, against which it abuts or which it is installed on the planar contact surface of the saddle pole, should be planar. The other sides of the planar slide block can have other surface geometries. They can be for example semi-round, whereas "round" should not be understood in the sense of circular but can be rather any curved line in its longitudinal cross-section. This embodiment of the slide block enables to vary its thickness without having to modify the form of the receiving groove, as it would be the case with a round slide block. Other possibilities, described more in detail below, can also be provided (except for the use of slide blocks of various thickness), so as to adapt the guiding means of the saddle pole in the cladding tube to the respective manufacturing tolerances of an individual saddle pole.

An advantageous variation of the invention is characterised in that at the lower end of the saddle pole, in its front area (as seen in driving direction) at least one groove-shaped recess is inserted each for receiving a front slide block and in its rear area a groove-shaped recess having a planar contact surface is inserted for receiving a rear planar slide block.

The advantage of said variation is due to the fact that during riding the load transfer into the front region of the cladding tube is high which is introduced optimally into the cladding tube by at least one slide block as well as the matching groove in the cladding tube. The guiding system is then optimal and stable when two slide blocks are provided spaced apart symmetrically laterally, relative to the driving direction, in the front area of the saddle pole.

The guiding system of the saddle pole can be optimised further by designing the front slide blocks also as planar slide blocks (GR) and when the front grooves in of the saddle pole also have planar surfaces. The play between saddle pole and cladding tube can also be adjusted using the thickness of the front slide blocks or via an adjustment foil.

According to another advantageous embodiment of the invention, the rear planar slide block has a rectangular cross-section. This is the easiest way of making such a slide block, if required in different thickness.

The manufacturing tolerances between saddle pole and cladding tube cannot be compensated for by slide blocks of different thickness only, but there is according to another advantageous embodiment of the invention also the possibility to provide an adjustment foil between the planar slide block and the matching planar surface of the saddle pole.

If the manufacturing tolerances can also be well compensated for by the use of slide blocks of different thickness and/or of adjustment foils a certain play must be left between saddle pole and cladding tube to guarantee that the height of the saddle pole can still be adjusted smoothly. To prevent said play from producing an unpleasant feeling due to a clattering and/or wobbling saddle pole, means are provided according to another advantageous embodiment of the invention with which the saddle pole is prestressed resiliently with respect to the cladding tube, preferably via at least one slide block. For that purpose, a slide block (preferably the planar slide block) itself can be prestressed in a convex manner or the adjustment foil (which may also consist of sheet metal or spring steel or a resilient synthetic material) is prestressed in a convex manner, or other means are provided, with which a spring effect can be obtained between saddle pole and cladding tube.

According to another advantageous embodiment of the invention, the cladding tube is the saddle tube of a bicycle. This enables to dispense with a separate cladding tube which is usually inserted into the saddle tube of the bicycle, and hence to reduce the weight thereof.

Two further advantageous embodiments of the invention are characterised in that the wall thickness of the saddle pole as well as the wall thickness of the cladding tube are reinforced in the region of the groove-shaped recesses. This enables to optimise the ratio between weight and stability.

BRIEF DESCRIPTION OF THE DRAWINGS

An exemplary embodiment of the invention is described below using drawings. Wherein.

DETAILED DESCRIPTION OF THE PREFERRED EMBODIMENTS

Figure 1:
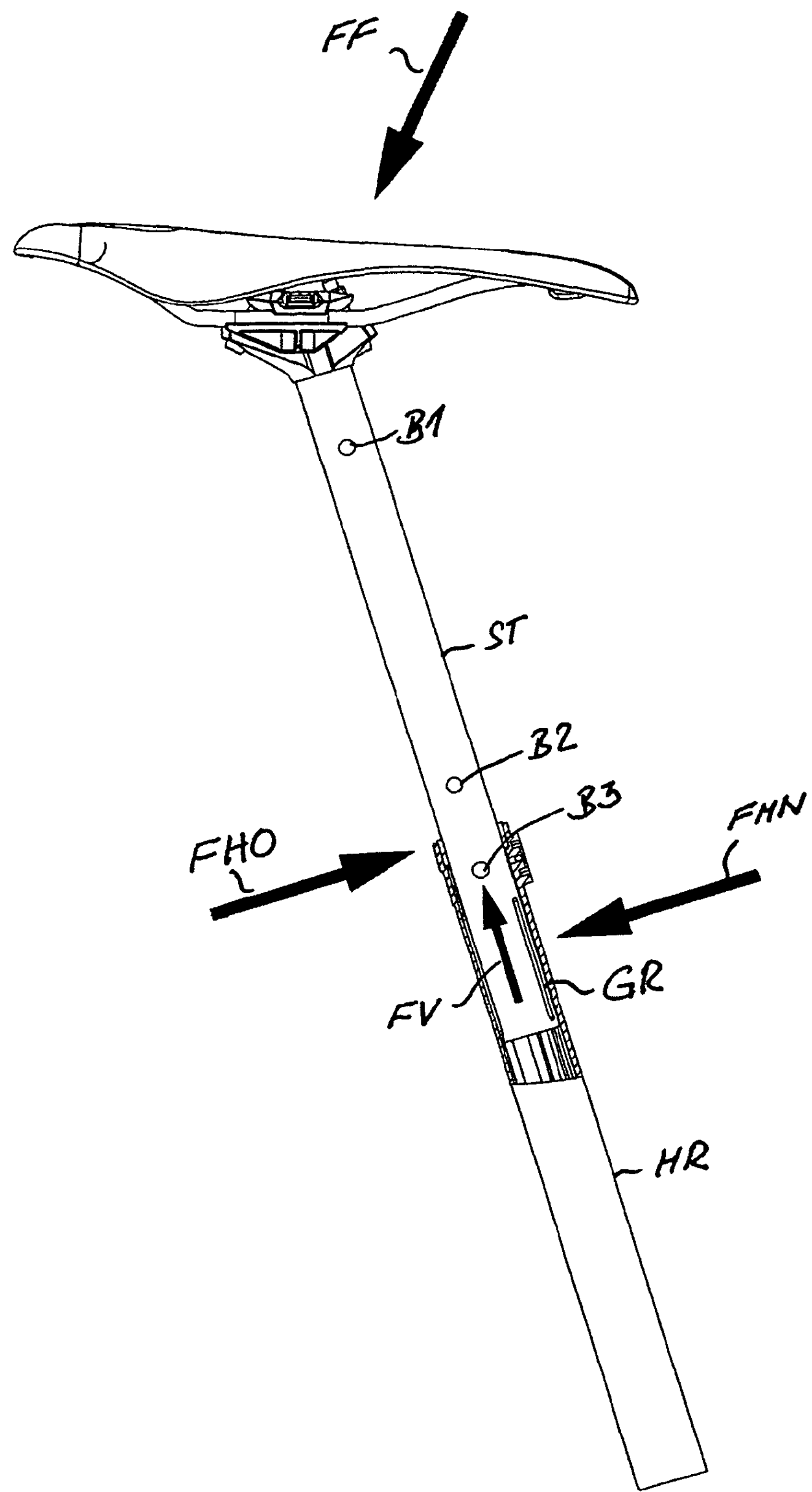
FIG. 1 shows a height adjustable saddle pole with the forces acting upon it

FIG. 1 shows the forces acting upon the saddle support tube ST and the cladding tube HR. (Indications below such as back, front, laterally, right, left, etc. always refer to the driving direction, which is displayed by the saddle tip). The weight force of the rider FF is exerted against the driving direction, backwards and downwards. Said weight force of the rider encounters a counterbearing at the upper end of the cladding tube HR by means of the force FHO as well as in the front area of the cladding tube HR, against which the sliding blocks GR, which are situated at the lower end of the saddle pole ST, are pushed by the leverage effect (force arrow FHN). The resulting force in the axial direction downwards is absorbed by the locking pin, not illustrated here, which engages into one of the bores B1, B2, B3 through the cladding tube HR (force arrow FV).

Figure 2:
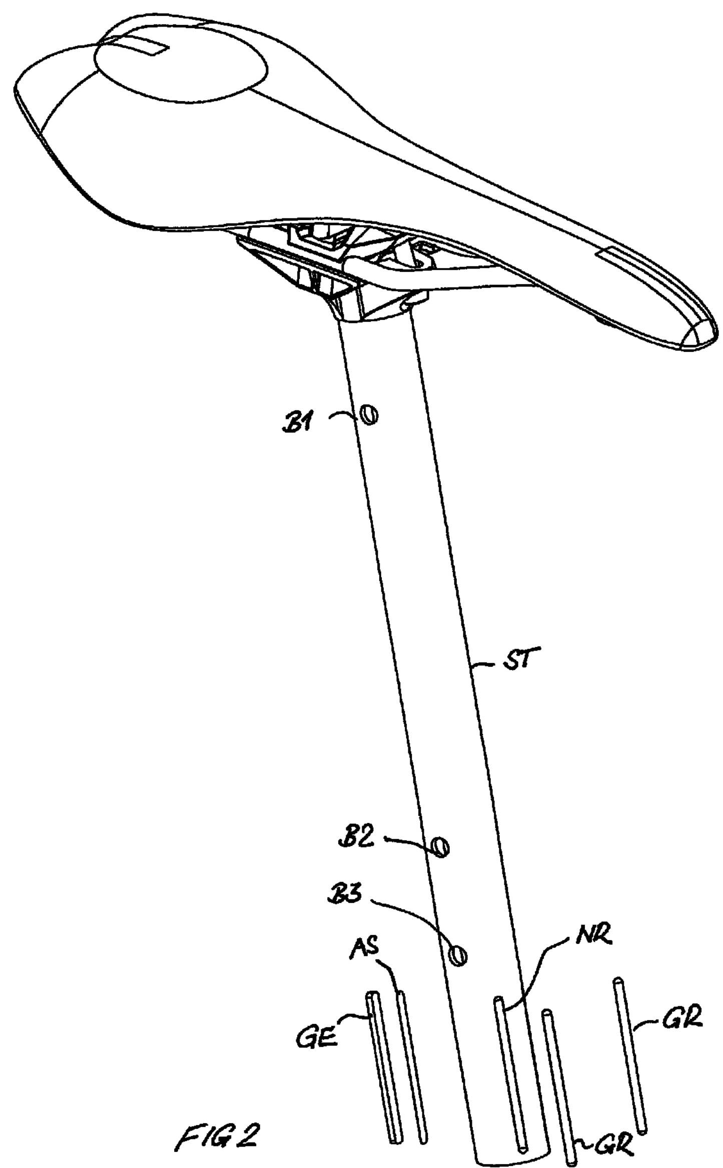
FIG. 2 shows a representation of the saddle pole with slide blocks and adjustment foil in exploded view

The optimal arrangement of the slide blocks is shown in the representation of the saddle pole ST according to FIG. 2. In that case, two round slide blocks GR are installed in the front area as well as a planar slide block GE, which has a rectangular cross-section in the exemplary embodiment, in the rear area of the saddle pole ST. The slide blocks GR, GE are inlaid in grooves NR provided to that end in the saddle pole ST. An adjustment foil AS can be provided between the planar slide block GE and the corresponding groove NR (non visible here) to compensate for the manufacturing tolerances, i.e. to compensate for the play between saddle pole ST and cladding tube HR. The “adjustment foil” need not inevitably be a foil of synthetic material, but rather the concept should be understood generally as a thin material, which for instance can be a steel plate or similar.

Figure 3:
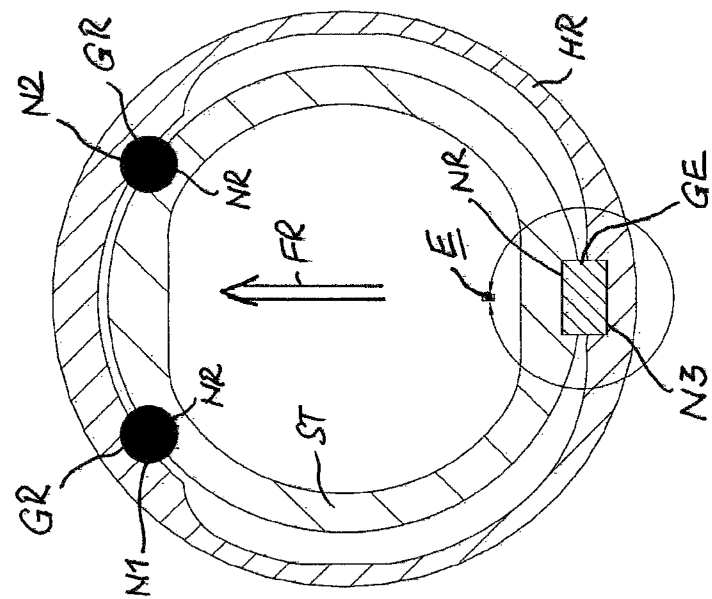
FIG. 3 shows a cross-section through cladding tube and saddle pole in the region of the slide blocks in elevation view

FIG. 3 shows a cross-section through the cladding tube HR and the saddle pole ST in the region of the slide blocks GR and GE in elevation view. The round slide blocks GR are inlaid in the front area (in the driving direction FR) of the saddle pole ST into the grooves NR provided to that effect and are guided in the guide grooves N1 to N2 of the cladding tube HR. The cladding tube as well as the saddle support tube ST are reinforced in the area of the groove blocks GR, GE to be better able to absorb the forces acting there (compare with FIG. 1).

Figure 4:
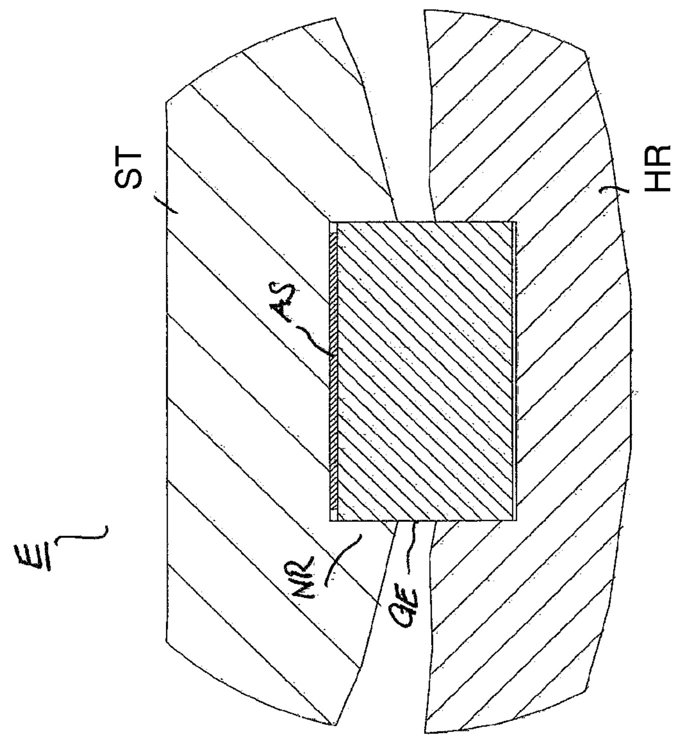
FIG. 4 shows the enlarged section E of FIG. 3

The section E of FIG. 3 is represented in enlargement in FIG. 4. It appears here clearly that the adjustment foil AS is inserted between the planar slide block GE and the planar surface of the groove NR in the saddle pole ST.

Figure 5:
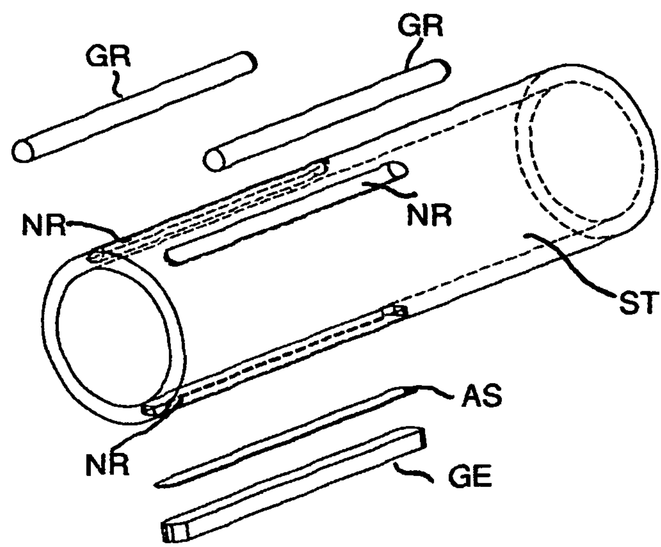
FIG. 5 shows a section of the lower end of the saddle pole with the slide blocks and the grooves for receiving the slide blocks
Figure 7:
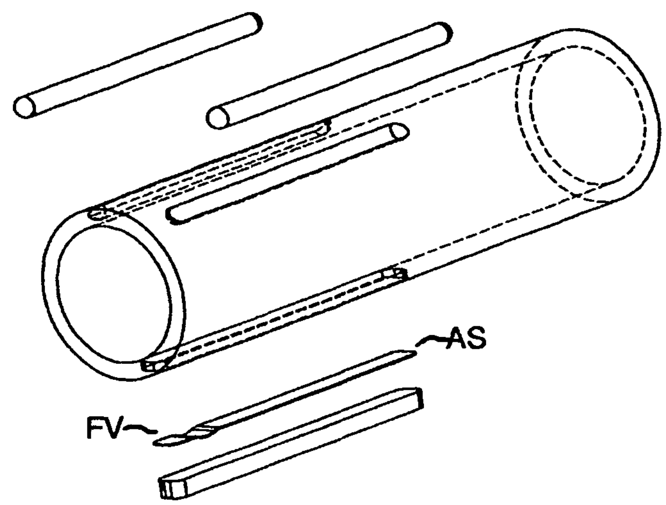
FIG. 7 shows a section as on FIG. 5 with a resilient adjustment foil
Figure 8:
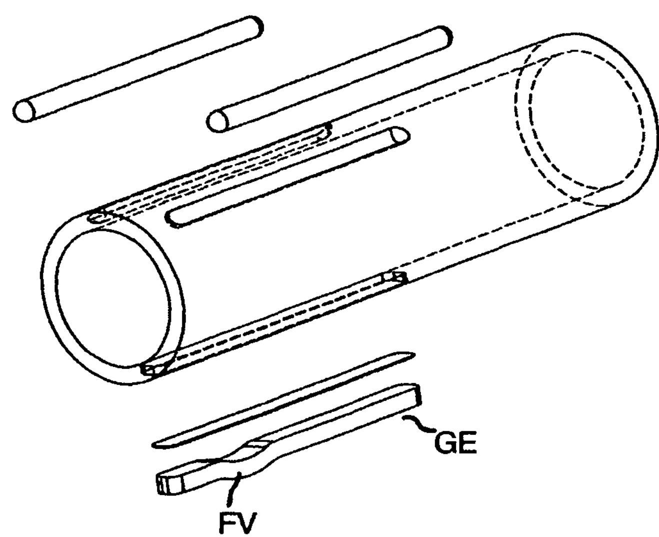
FIG. 8 shows a section as on FIG. 5 with a resilient planar slide block

FIG. 5 shows a section of the lower end of the saddle pole ST in transparency with the slide blocks GR, GE, the grooves NR for receiving the slide blocks GR, GE, as well as the adjustment foil AS. As described initially, the use of slide blocks GR, GE of different thickness, preferably of the planar slide block GE and/or of an accordingly thick adjustment foil enables to compensate correctly for the manufacturing tolerance between the saddle pole ST and the cladding tube HR. There still must be a residual play, so that the saddle pole ST can still be guided correctly in the cladding tube HR. To prevent said play from producing an unpleasant feeling due to a clattering and/or wobbling saddle pole, measures are described in FIGS. 6-7 with which the saddle pole is prestressed resiliently with respect to the cladding tube, preferably via at least one slide block GR, GE.—For the sake of clarity, identical reference signs have not been repeated in FIGS. 6-8.

Figure 6:
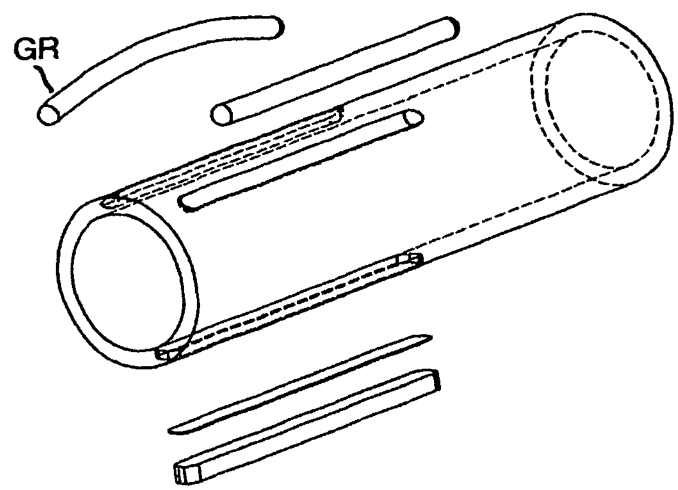
FIG. 6 shows a section as on FIG. 5 with a round slide block which is prestressed resiliently in a convex manner

To meet this target, a round slide block GR prestressed resiliently in a convex manner is provided in FIG. 6. Judicious selection of the material for the slide block GR as well as the corresponding prestress (both being left to the initiative of the person skilled in the art) enable to achieve the desired spring effect. The adjustment foil AS is formed resiliently in the illustration according to FIG. 7 in a portion with a resilient prestress. Naturally, the adjustment foil AS similarly to the round slide block GR shown in FIG. 6 can be designed in a convex manner or in a concave manner over their total length. In the illustration according to FIG. 8, the portion is provided with the resilient prestress FV with respect to the planar slide block GE. But the resilient prestress FV can also be achieved using other spring elements, non-illustrated here, but known to those skilled in the art. Bores could thus be inserted into the grooves NR, through which bores a spiral spring or a leaf spring etc. acts upon the groove blocks GR, GE from the rear. The means for prestressing the saddle pole ST with respect to the cladding tube HR need not compulsorily be provided via the groove blocks GR, GE or the adjustment foils AS, although this forms a straightforward and cost-effective embodiment. It is left to the initiative of the person skilled in the art to realise other resilient prestresses for instance via an O-ring or other means.

Figure 9:
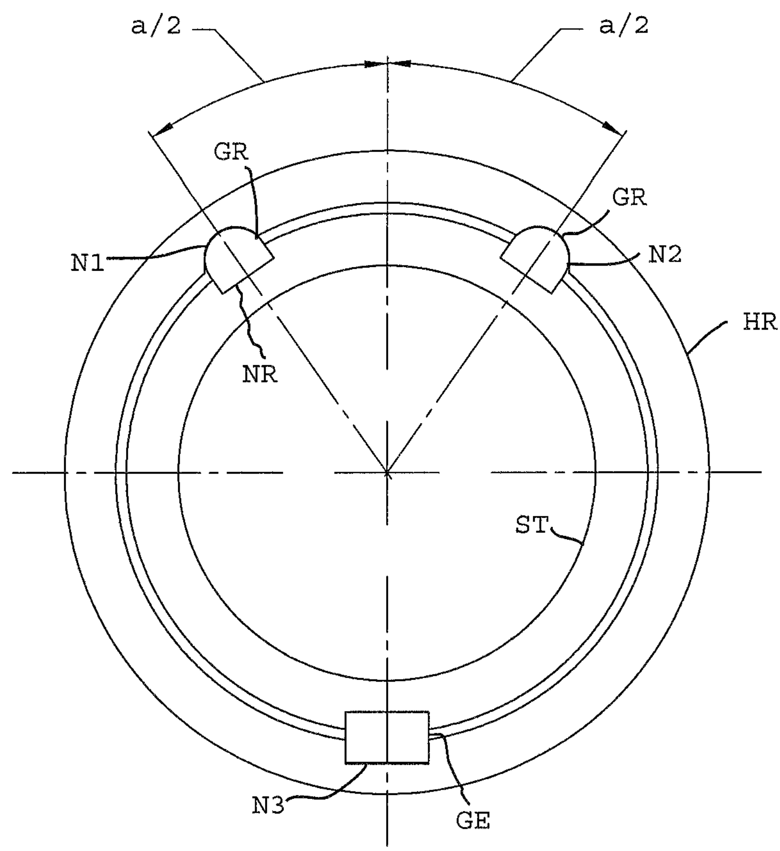
FIG. 9 shows a further cross-section through cladding tube and saddle pole in the region of the slide blocks in elevation view

FIG. 9 shows a schematic cross-section through cladding tube and saddle pole in the region of the slide blocks in elevation view (as in FIG. 3). The front slide blocks GR are also designed as planar slide blocks. Consequently, the variation in thickness of the front slide blocks GR or the use of corresponding adjustment foil enable to adjust the play between saddle pole ST and cladding tube HR accordingly.

To conclude, it should be pointed out that the saddle pole is guided without any additional or other guiding means (this does not apply for guiding means, which can be foreseen at the upper end of the cladding tube HR. Such guiding means are not subject of this invention. An example for such guiding means can be seen in the DE 10 2010 044 356.5 and are well known to the person skilled in the art from the state in the art), thanks to the constructive measures described, which is on the one hand adapted optimally to the load situation during riding and to the forces hence acting upon the saddle pole, on the other hand, the device according to the invention prevents at the same time the saddle pole from being twisted with respect to the cladding tube.

The invention claimed is:

1. A guide device comprising:

a saddle for a bicycle;

a saddle pole mounted to the saddle and having a rear saddle pole groove-shaped recess and having at least one front saddle pole groove-shaped recess, the rear saddle pole-groove-shaped recess comprising a first planar contact surface;

a rear slide block having a planar surface and installed on the saddle pole at a lower end of the saddle pole so that the planar surface of the rear slide block is on the first planar contact surface of the saddle pole;

a cladding tube having a rear cladding tube groove-shaped recess and a at least one front cladding tube groove-shaped recess; and at least one front slide block installed on the saddle pole and disposed in the at least one front saddle pole groove-shaped recess so that the at least one front slide block is arranged forward of the rear slide block, wherein the rear slide block engages in the rear cladding tube groove-shaped recess in the cladding tube and the at least one front slide block engages in the at least one front cladding tube groove-shaped recess, and wherein a cross-section of the at least one front slide block and a coplanar cross-section of the rear slide block are different, wherein the coplanar cross-sections are perpendicular to a longitudinal axis of the device.

2. The guide device according to claim 1, wherein the at least one front saddle pole groove-shaped recess comprises a second planar contact surface; and wherein the at least one front cladding tube groove-shaped recess comprises a non-planar contact surface; and wherein the cross-section of the at least one front slide block is rectangular in an area engaging the at least one front saddle pole groove-shaped recess and is round in an area engaging the at least one front cladding tube groove-shaped recess.

3. The guide device according to claim 1, wherein the cross-section of the rear slide block is rectangular.

4. The guide device according to claim 1, further comprising an adjustment foil disposed between the rear slide block and the first planar contact surface of the saddle pole.

5. The guide device according to claim 4, wherein the adjustment foil is configured to resiliently prestress the saddle pole with respect to the cladding tube.

6. The guide device according to claim 1, further comprising a prestresser configured to resiliently prestress the saddle pole with respect to the cladding tube.

7. A bicycle comprising a guide device according to claim 1, wherein the cladding tube of the guide device is a saddle tube of the bicycle.

8. The guide device for according to claim 1, wherein a wall thickness of the cladding tube is reinforced in a region of the rear cladding tube groove-shaped recess.

9. The guide device according to claim 1, wherein a wall thickness of the saddle pole is reinforced in regions of the rear and the at least one front saddle pole groove-shaped recesses.

10. The guide device according to claim 1, wherein the rear slide block is a prestresser configured to resiliently prestress the saddle pole with respect to the cladding tube.

11. The guide device according to claim 1, wherein the cross-section of the at least one front slide block is a solid circle.

12. The guide device according to claim 1, wherein the at least one front slide block comprises two front slide blocks disposed symmetric to the front of the saddle pole.

13. A guide device, comprising:

a saddle for a bicycle;

a cladding tube having a rear cladding tube groove-shaped recess, a front-left cladding tube groove-shaped recess, and a front-right cladding tube groove-shaped recess;

a saddle pole mounted to the saddle and slidably engaging the cladding tube, the saddle pole having a rear saddle pole groove-shaped recess, a front-left saddle pole groove-shaped recess, and a front-right saddle pole groove-shaped recess;

a rear slide block having a planar inner surface in the rear saddle pole groove-shaped recess and an outer surface in the rear cladding tube groove-shaped recess;

a front-left slide block having a round inner surface in the front-left saddle pole groove-shaped recess and an outer surface in the front-left cladding tube groove-shaped recess; and a front-right slide block having a round inner surface in the front-right saddle pole groove-shaped recess and an outer surface in the front-right cladding tube groove-shaped recess.

14. A guide device as in claim 13, wherein the outer surface of the rear slide block is planar, and wherein the outer surface of the front-left slide block is round, and wherein the outer surface of the front-right slide block is round.

15. The guide device as in claim 14, further comprising an adjustment foil disposed within the rear saddle pole groove-shaped recess and in contact with the planar inner surface of the rear slide block.

16. The guide device as in claim 15, wherein the adjustment foil consist of sheet metal or spring steel or a resilient synthetic material and is prestressed in a convex manner.

17. The guide device as in claim 14, wherein the rear slide block is prestressed in a convex manner whereby a spring effect is obtained between the saddle pole and the cladding tube.

* * * * *